United States Patent
Li

(10) Patent No.: US 10,136,202 B1
(45) Date of Patent: Nov. 20, 2018

(54) ELECTRONIC APPARATUS

(71) Applicant: MERRY ELECTRONICS(SHENZHEN) CO., LTD., Guangdong (CN)

(72) Inventor: Hung-Yuan Li, Taichung (TW)

(73) Assignee: MERRY ELECTRONICS(SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 15/853,876

(22) Filed: Dec. 25, 2017

(30) Foreign Application Priority Data

Sep. 22, 2017 (TW) .............................. 106132665 A

(51) Int. Cl.
  *H04R 3/00* (2006.01)
  *H04R 1/02* (2006.01)
  *H04B 10/114* (2013.01)
  *G02B 13/14* (2006.01)

(52) U.S. Cl.
  CPC ........... *H04R 1/021* (2013.01); *H04B 10/114* (2013.01); *H04R 3/00* (2013.01); *G02B 13/14* (2013.01); *H04R 2201/10* (2013.01)

(58) Field of Classification Search
  CPC .......... G02B 13/14; H04R 1/021; H04R 3/00; H04R 2201/10; H04B 10/114
  See application file for complete search history.

(56) References Cited

U.S. PATENT DOCUMENTS

| | | | |
|---|---|---|---|
| 2003/0169901 A1* | 9/2003 | Pavlidis | G06K 9/00228 382/103 |
| 2008/0100910 A1* | 5/2008 | Kim | G02B 5/282 359/356 |
| 2009/0067040 A1* | 3/2009 | Izumi | G02B 13/146 359/356 |
| 2010/0102230 A1* | 4/2010 | Chang | G01J 1/32 250/338.4 |
| 2010/0200752 A1* | 8/2010 | Lee | H04N 5/2254 250/330 |
| 2011/0034218 A1* | 2/2011 | Sung | H04R 1/2842 455/569.1 |
| 2013/0236027 A1* | 9/2013 | Tao | H04W 52/0241 381/74 |

(Continued)

*Primary Examiner* — Davetta W Goins
*Assistant Examiner* — Kuassi Ganmavo
(74) *Attorney, Agent, or Firm* — CKC & Partners Co., Ltd.

(57) ABSTRACT

The present disclosure proposes an electronic apparatus including an attenuation element, a passive infrared (PIR) sensor, and a control circuit. The attenuation element attenuates a first infrared signal as a second infrared signal. The PIR includes a filtering element and a receiving sensor. The filtering element filters the second infrared signal as a third infrared signal, wherein a wavelength thereof ranges between 9 and 10 micrometer. When a distance between the attenuation element and a source emitting the first infrared signal is not larger than a predetermined distance, the receiving sensor outputs a first electrical signal in response to the third infrared signal, otherwise the receiving sensor outputs a second electrical signal in response to the third infrared signal. The control circuit activates the electronic apparatus according to the first electrical signal or deactivates the electronic apparatus according to the second electrical signal.

7 Claims, 4 Drawing Sheets

(56) References Cited

U.S. PATENT DOCUMENTS

2014/0133669 A1* 5/2014 Klinghult ............ H04M 1/6066
　　　　　　　　　　　　　　　　　　　　　　381/74
2015/0281826 A1* 10/2015 Huang ................. H04R 1/1041
　　　　　　　　　　　　　　　　　　　　　　381/74

* cited by examiner

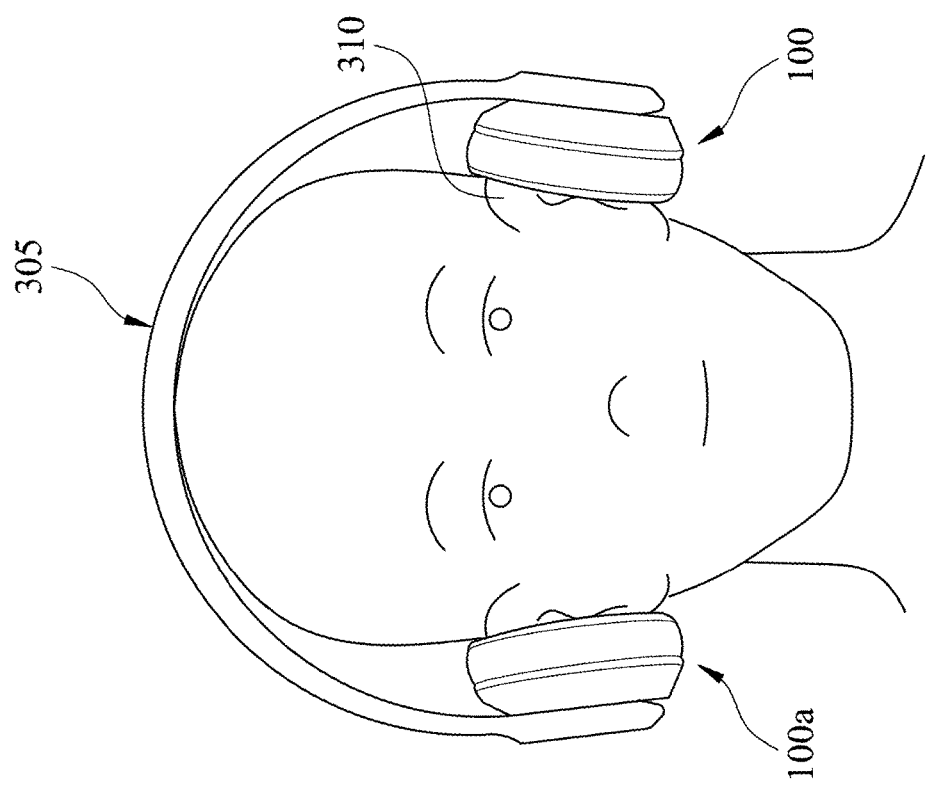

US 10,136,202 B1

ELECTRONIC APPARATUS

RELATED APPLICATIONS

This application claims priority to Taiwan Application Serial Number 106132665, filed Sep. 22, 2017, which is herein incorporated by reference.

BACKGROUND

Technical Field

The present disclosure relates to an electronic apparatus. More particularly, the present disclosure relates to an electronic apparatus that can be activated or deactivated according to the distance between the user and the electronic apparatus.

Description of Related Art

Along with the popularity of smart devices (e.g., smart phones and tablets), people have been used to use these devices as the media for listening to music or watching videos. However, a user may be needed to temporarily stop listening when using headphones (or earphones) to listen to the voice from these devices. At this moment, if the user merely takes off the headphones without manually deactivating, stopping, or turning off the devices playing the music or videos, these devices may continue to play music or videos while the user is not listening and/or watching, such that additional power consumption may be generated. In addition, after the user puts on the headphone again, the user may need to manually adjust the playing progress to listen or watch those parts that haven't been listened or watched, which is inconvenient and not intuitive to the user.

As such, to people with ordinary in the art, it is important to design a mechanism to automatically activate or deactivate the devices based on the usage of the user.

SUMMARY

According to one aspect of the present disclosure, an electronic apparatus includes a housing, a speaker, an attenuation element, a passive infrared sensor, and a control circuit. The housing has an inner chamber. The speaker is disposed in the housing and segments the inner chamber into a front chamber and a back chamber. The attenuation element is passed through by a first infrared signal, wherein the first infrared signal comes from an external signal source, and the attenuation element attenuates an energy of the first infrared signal to generate a second infrared signal. The passive infrared sensor is disposed in the inner chamber of the housing and includes a filtering element and a receiving sensor. The filtering element receives the second infrared signal and filters the second infrared signal as a third infrared signal, wherein a wavelength of the third infrared signal ranges between 9 to 10 micrometers. The receiving sensor receives the third infrared signal, wherein when a distance between the attenuation element and the external signal source is not larger than a predetermined distance, the receiving sensor outputs a first electrical signal in response to the third infrared signal, and when the distance between the attenuation element and the external signal source is larger than the predetermined distance, the receiving sensor outputs a second electrical signal in response to the third infrared signal. The control circuit activates the electronic apparatus according to the first electrical signal or deactivates the electronic apparatus according to the second electrical signal.

BRIEF DESCRIPTION OF THE DRAWINGS

The present disclosure can be more fully understood by reading the following detailed description of the embodiment, with reference made to the accompanying drawings as follows:

FIG. 3 is a scenario of using the electronic apparatus according to an embodiment of the present disclosure.

DETAILED DESCRIPTION

Figure 1A:
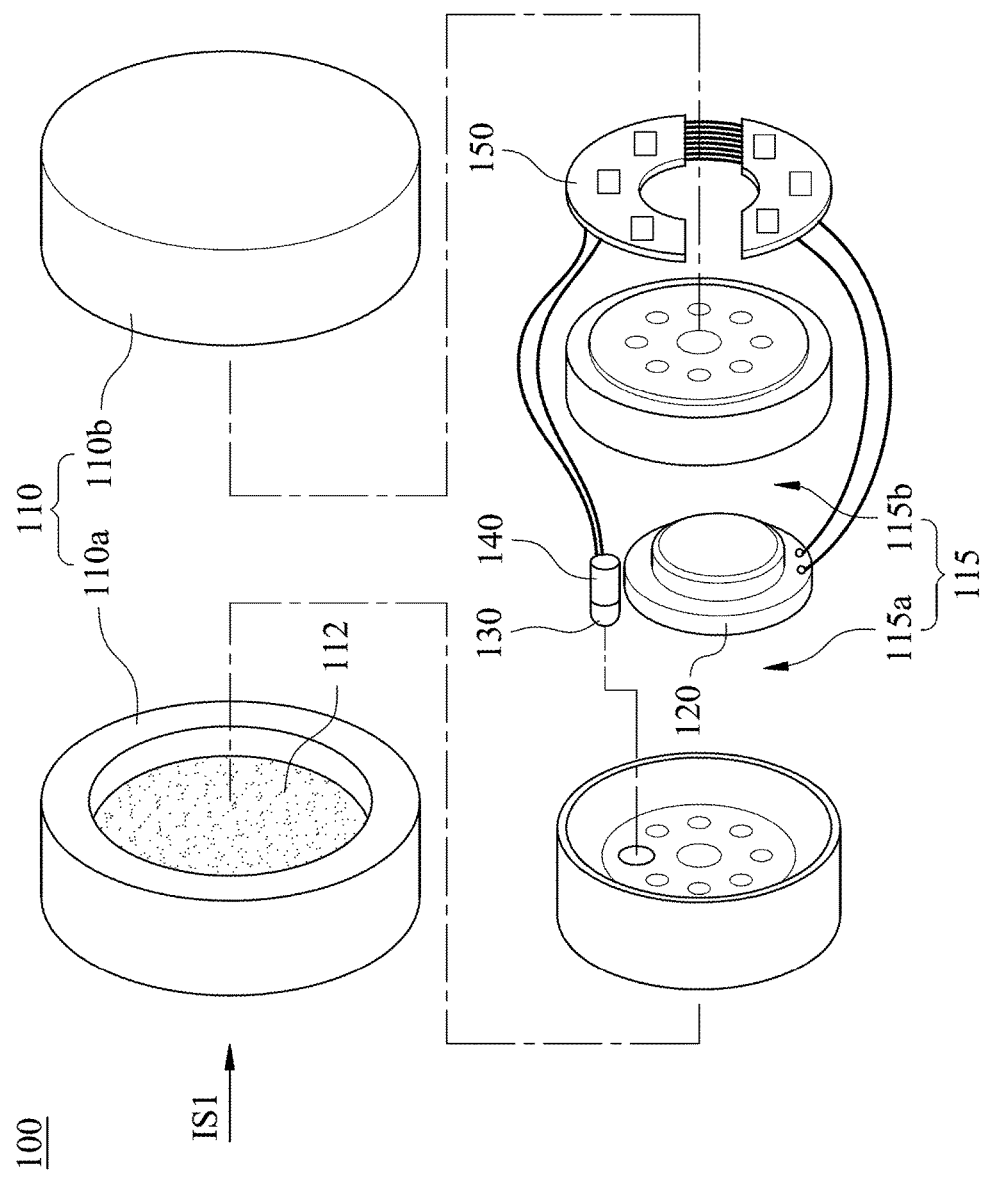
FIG. 1A is an exploded view of an electronic apparatus of an embodiment of the present disclosure.
Figure 1B:
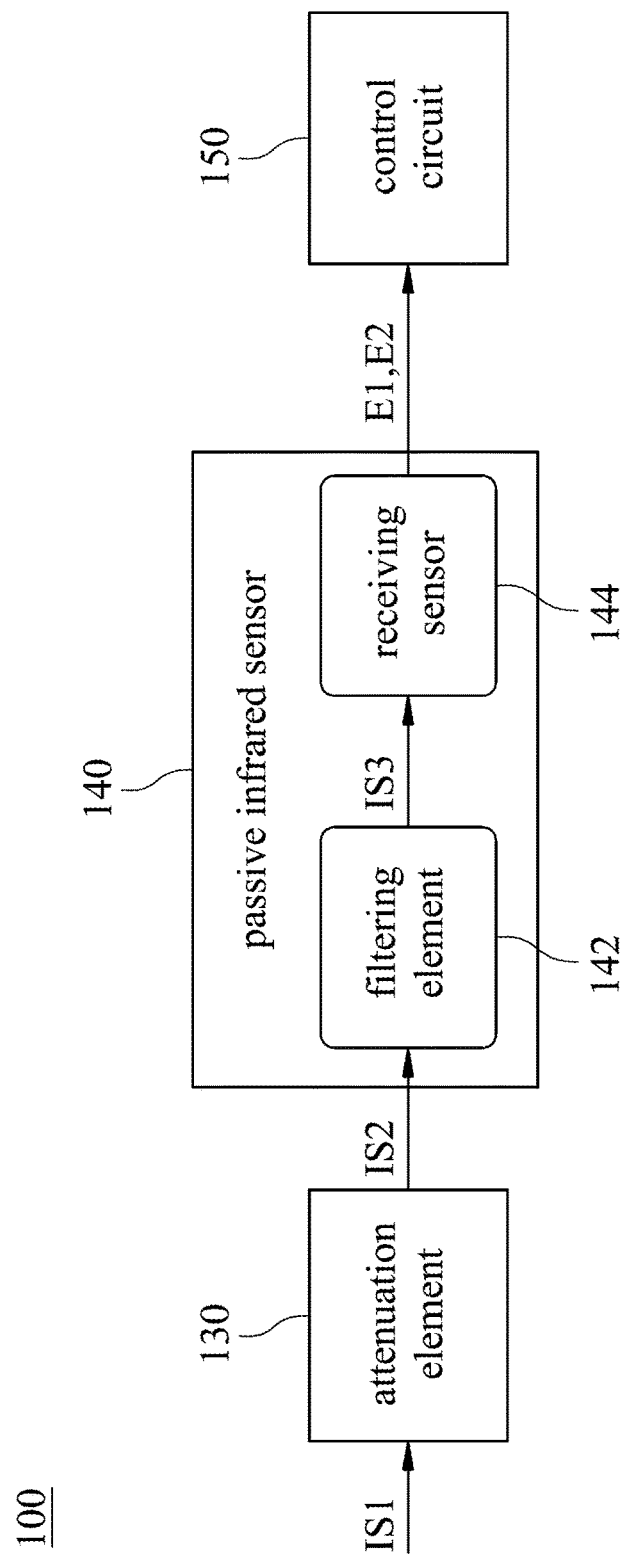
FIG. 1B is a block diagram of a part of the electronic apparatus according to FIG. 1A.

See FIG. 1A and FIG. 1B, wherein FIG. 1A is an exploded view of an electronic apparatus 100 of an embodiment of the present disclosure, and FIG. 1B is a block diagram of a part of the electronic apparatus 100 according to FIG. 1A. In FIG. 1A and FIG. 1B, the electronic apparatus 100 is, for example, a headphone which includes a housing 110, a speaker 120, an attenuation element 130, a passive infrared sensor 140, and a control circuit 150. The housing 110 of the present embodiment may be formed by assembling a front part 110a with a back part 110b, and an inner chamber 115 may be formed between the front part 110a and the back part 110b. In addition, a foam 112 may be disposed on the front part 110a of the housing 110, and the foam 112 may receive a first infrared signal IS1 and let the first infrared signal IS1 pass through. In the present embodiment, the first infrared signal IS1 may be emitted by an external signal source which may be any object that can radiate heat, such as a human.

The speaker 120 is disposed in the housing 110 and segments the inner chamber 115 of the housing 110 into a front chamber 115a and a back chamber 115b. In the present embodiment, the attenuation element 130 may be passed through by the first infrared signal IS1 and attenuate the energy of the first infrared signal IS1 to generate a second infrared signal IS2. The attenuation element 130 may be disposed in the front chamber 115a for better receiving the first infrared signal IS1.

In various embodiments, the attenuation element 130 may include a plurality of lens elements (e.g., Fresnel lens elements) that are stacked with each other to enhance the capability of attenuating the energy of the first infrared signal IS1. In one embodiment, the attenuation element 130 may be formed by stacking a first Fresnel lens element with a second Fresnel lens element, wherein the transmittances of the first Fresnel lens element and the second Fresnel lens element may be 3.2% and 3.4%, respectively. As such, the transmittance of the attenuation element 130 may be lowered to 0.1%, but the present disclosure is not limited thereto.

Moreover, the aforementioned lens elements may be aspects with a larger thickness (e.g., thicker than 1.2 millimeters) to attenuate the energy of the first infrared signal IS1. In one embodiment, the attenuation element 130 may be formed by one or more dark lens elements whose transmittance is lower than 3.5% to better attenuate the energy of the first infrared signal IS1. In another embodiment, the attenuation element 130 may be any object that may reduce the energy of the second infrared signal IS2 to be lower than 0.1% of the intensity of the first infrared signal IS1, but the present disclosure is not limited by the previous implementations.

Under the situation of disposing the attenuation 130 in the electronic apparatus 100, only the first infrared signal IS1 emitted by the external signal source that is spaced from the attenuation element 130 by less than a predetermined distance (e.g., 2 centimeters) may possess the energy that is sufficient to pass the attenuation element 130. In other words, after the first infrared signal IS1 emitted by the external signal source that is spaced from the attenuation element 130 by more than the predetermined distance is attenuated, only the second infrared signal IS2 with nearly zero energy will be correspondingly generated.

The passive infrared sensor 140 is disposed in the inner chamber 115 of the housing 110, and the passive infrared sensor 140 includes a filtering element 142 and a receiving sensor 144. The filtering element 142 (e.g., a filter lens) receives the second infrared signal IS2 and filters the second infrared signal IS2 as a third infrared signal IS3, wherein a wavelength of the third infrared signal IS3 ranges between 9 to 10 micrometers. That is, the components of the second infrared signal IS2 whose wavelengths are not between 9 and 10 millimeters will be filtered by the filtering element 142. Since the infrared signals whose wavelengths ranging between 9 and 10 millimeters are usually emitted by humans, the filtering element 142 may be regarded as making the third infrared signal IS3 only include the infrared signals from humans.

Next, the receiving sensor 144 receives the third infrared signal IS3. Under the situation of disposing the attenuation element 130 and the filtering element 142 in the electronic apparatus 100, only the first infrared signal IS1 emitted by a human that is spaced from the attenuation element 130 by less than the predetermined distance (e.g., 2 centimeters) may correspondingly generate the third infrared signal IS3 with certain energy to be received by the receiving sensor 144 after experiencing the aforementioned attenuation and filtering. On the other hand, the first infrared signal IS1 emitted by the human that is spaced from the attenuation element 130 by more than the predetermined distance will still generate the third infrared signal IS3 with nearly zero energy after experiencing the aforementioned attenuation and filtering.

When a distance between the attenuation element 130 and the external signal source (e.g., a human) is not larger than the predetermined distance, the receiving sensor 144 outputs a first electrical signal E1 in response to the third infrared signal IS3. On the other hand, when the distance between the attenuation element 130 and the external signal source is larger than the predetermined distance, the receiving sensor 144 outputs a second electrical signal E2 in response to the third infrared signal IS3.

Afterwards, the control circuit 150 coupled to the speaker 120 and the receiving sensor 144 activates the electronic apparatus 100 according to the first electrical signal E1 or deactivates the electronic apparatus 100 according to the second electrical signal E2. In various embodiments, the control circuit 150 may be a central processing unit, a microprocessor, a microcontroller, a digital signal processor, a baseband processor, an image processing chip, or an application-specific integrated circuit that is disposed on a printed circuit board, but the present disclosure is not limited thereto.

In detail, as mentioned before, the third infrared signal IS3 will have certain energy when the external signal source is a human that is spaced from the attenuation element 130 by less than the predetermined distance, such that the receiving sensor 144 may correspondingly output the first electrical signal E1. That is, when the receiving sensor 144 outputs the first electrical signal E1, it represents that the attenuation element 130 is very close to a human (i.e., the user), and hence the control circuit 150 may correspondingly activate (e.g., turn on) the electronic apparatus 100 for the user to operate. In other words, when the user wants to activate the electronic apparatus 100, the user does not need to manually activate the electronic apparatus 100, and hence the user may operate the electronic apparatus 100 in a more convenient and intuitive way.

On the other hand, even the external signal source is a human, when the external signal source is spaced from the attenuation element 130 by more than the predetermined distance, the first infrared signal IS1 from the external signal source will correspondingly lead to the third infrared signal IS3 with nearly zero energy, such that the receiving sensor 144 will correspondingly output the second electrical signal E2. That is, when the receiving sensor 144 outputs the second electrical signal E2, it represents that the attenuation element 130 is away from the human (i.e., the user), and hence the control circuit 150 may correspondingly deactivate (e.g., turn off) the electronic apparatus 100. In other words, when the user needs to stop using the electronic apparatus 100, all he/she has to do is take the electronic apparatus 100 away without manually deactivating the electronic apparatus 100.

By the discussions above, the electronic apparatus 100 of the present disclosure may be automatically activated or deactivated according to the distance between the user and the electronic apparatus 100, which makes the usage more convenient and intuitive.

From another perspective, since the electronic apparatus 100 of the present disclosure is disposed with the attenuation element 130, only the infrared signals from the humans spaced from the attenuation element 130 by less than the predetermined distance (e.g., 2 centimeters) will be received by the receiving sensor 144, which results in a mechanism that is different from the conventional applications of the passive infrared sensor. Specifically, in the conventional applications of the passive infrared sensor, the lights from farther places will be collected by a condenser (e.g., a convex lens), and then the collected lights will received by the conventional passive infrared sensor. As a result, the detection distance of the conventional passive infrared sensor may be extended from meters to dozens of meters, which is opposite to the concept of shortening the detection distance by disposing the attenuation element 130 of the present disclosure.

Figure 2:
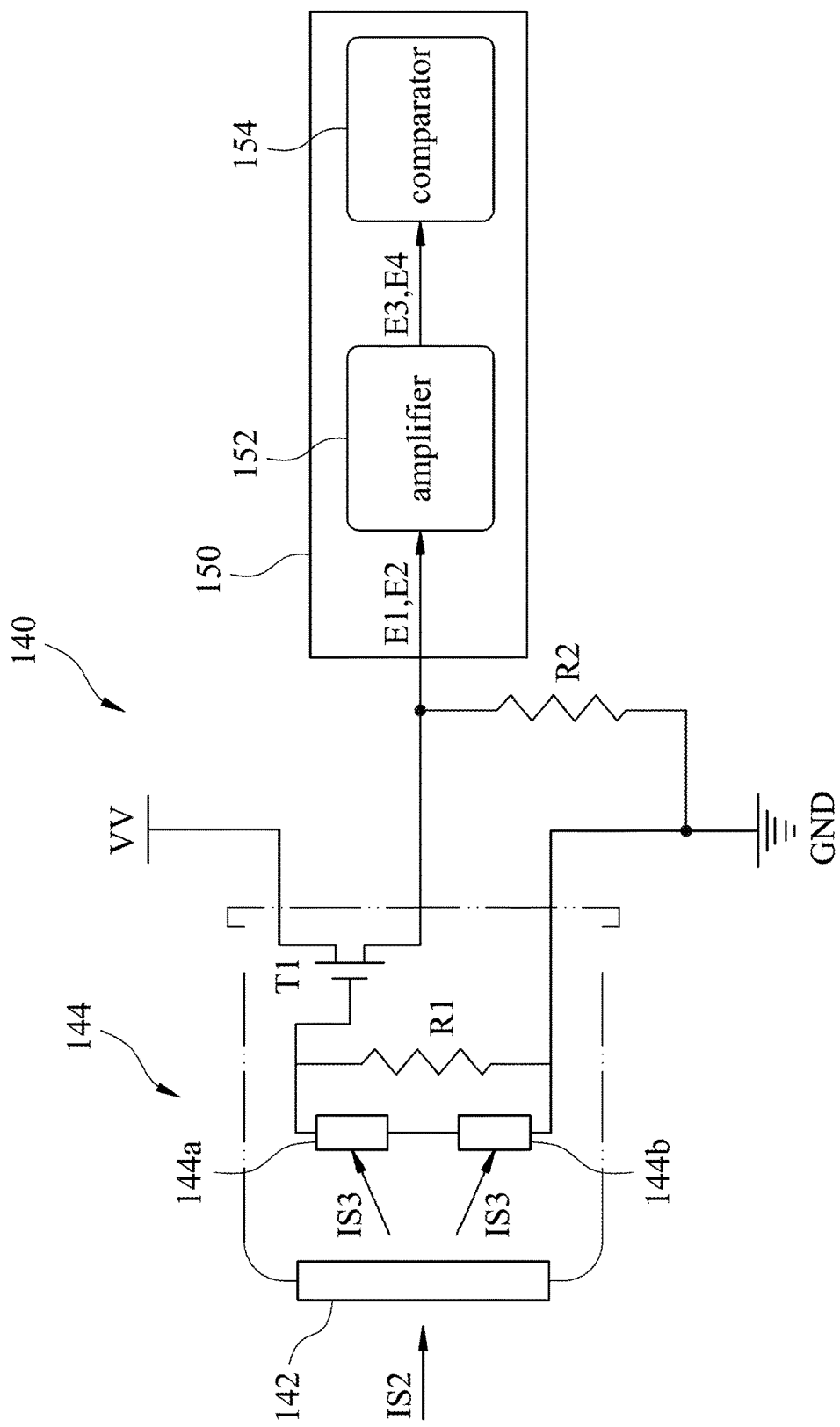
FIG. 2 is a block diagram of the passive infrared sensor and the control circuit of FIG. 1B.

See FIG. 2, which is a block diagram of the passive infrared sensor 140 and the control circuit 150 of FIG. 1B. In the present embodiment, the receiving sensor 144 of the passive infrared sensor 140 may include a first sensing element 144a, a second sensing element 144b, a first resistor R1, a transistor T1, and a second resistor R2. Each of the first sensing element 144a and the second sensing element 144b has a first terminal and a second terminal, wherein the first terminal of the second sensing element 144b is coupled to the first terminal of the first sensing element 144a, the second terminal of the second sensing element 144b is coupled to a ground GND, and the first terminal of the first sensing element 144a and the first terminal of the second sensing element 144b have the same polarities. In the present embodiment, the first sensing element 144a and the second sensing element 144b may be pyroelectric Infrared radial sensors that can transform the variation of infrared signals into electrical signals, but the present disclosure is not limited thereto.

The first resistor R1 has a first terminal and a second terminal, wherein the first terminal of the first resistor R1 is coupled to the second terminal of the first sensing element 144a, and the second terminal of the first resistor R1 is coupled to the second terminal of the second sensing element 144b. The transistor T1 has a first terminal, a second terminal, and a control terminal, wherein the control terminal of the transistor T1 is coupled to the second terminal of the first resistor R1, the first terminal of the transistor T1 is coupled to a power VV, and the second terminal of the transistor T1 outputs the first electrical signal E1 or the second electrical signal E2. The second resistor R2 has a first terminal and a second terminal, wherein the second terminal of the second resistor R2 is coupled to the second terminal of the transistor T1, and the second terminal of the second resistor R2 is coupled to the ground GND.

In addition, the control circuit 150 includes an amplifier 152 and a comparator 154. The amplifier 152 is coupled to the passive infrared sensor 140, and amplifies the first electrical signal E1 as a third electrical signal E3 or amplifies the second electrical signal E2 as a fourth electrical signal E4. In the present embodiment, the gain of the amplifier 152 may be set as a lower value (e.g., 100) to correspondingly shorten the predetermined distance.

The comparator 154 is coupled to the amplifier 152 and compares the third electrical signal E3 with a predetermined threshold or compares the fourth electrical signal E4 with the predetermined threshold. The predetermined threshold may be any empirical values set by the designer, which may be used as a reference for the control circuit 150 to determine whether the external signal source (e.g., a human) is spaced from the electronic apparatus 100 by less than the predetermined distance, and the mechanism thereof will be discussed in the following paragraphs.

As shown in FIG. 2, both of the first sensing element 144a and the second sensing element 144b can sense the third infrared signal IS3. When the first sensing element 144a senses the third infrared signal IS3 earlier than the second sensing element 144b or when the second sensing element 144b senses the third infrared signal IS3 earlier than the first sensing element 144a, a pulse will correspondingly occur to the voltage of the first electrical signal E1. Furthermore, when the third infrared signal IS3 is sensed by both of the first sensing element 144a and the second sensing element 144b, the pulse of the first electrical signal E1 will correspondingly disappear.

Next, the amplifier 152 may amplify the first electrical signal E1 as the third electrical signal E3, and the comparator 154 may determine whether the voltage of the third electrical signal E3 is higher than the predetermined threshold. If the voltage of the third electrical signal E3 is higher than the predetermined threshold, the control circuit 150 may correspondingly activate (e.g., turn on) the electronic apparatus 100.

In detail, when the pulse occurs on the first electrical signal E1, it represents that the distance between the electronic apparatus 100 and the user is less than the predetermined distance, and hence the designer may empirically set the predetermined threshold to be lower than the voltage value of the amplified pulse. As such, when the comparator 154 determines that the voltage of the third electrical signal E3 is higher than the predetermined threshold, the control circuit 150 may correspondingly activate the electronic apparatus 100. In other words, when the user wants to activate the electronic apparatus 100, all he/she has to do is approach the electronic apparatus 100 without manually activating the electronic apparatus 100, and hence the electronic apparatus 100 can be operated in a more convenient and intuitive way.

On the other hand, when the first sensing element 144a fails to sense the third infrared signal IS3 earlier than the second sensing element 144b or when the second sensing element 144b fail to sense the third infrared signal IS3 earlier than the first sensing element 144a, another pulse will correspondingly occur to the voltage of the second electrical signal E2. Furthermore, when both of the first sensing element 144a and the second sensing element 144b fail to sense the third infrared signal IS3, the other pulse of the second electrical signal E2 will correspondingly disappear.

Next, the amplifier 152 may amplify the second electrical signal E2 as the fourth electrical signal E4, and the comparator 154 may determine whether the voltage of the fourth electrical signal E4 is higher than the predetermined threshold. If the voltage of the fourth electrical signal E4 is higher than the predetermined threshold, the control circuit 150 may correspondingly deactivate (e.g., turn off) the electronic apparatus 100.

In detail, when the other pulse occurs on the second electrical signal E2, it represents that the distance between the electronic apparatus 100 and the user is larger than the predetermined distance. As such, when the comparator 154 determines that the voltage of the fourth electrical signal E4 is higher than the predetermined threshold, the control circuit 150 may correspondingly deactivate the electronic apparatus 100. In other words, when the user wants to deactivate the electronic apparatus 100, all he/she has to do is take the electronic apparatus 100 away without manually deactivating the electronic apparatus 100.

In one embodiment, the passive infrared sensor 140 may output the second electrical signal E2 in response to the third infrared signal IS 3 every first duration after the control circuit 150 activated the electronic apparatus 100. Moreover, the passive infrared sensor 140 may output the first electrical signal E1 in response to the third infrared signal IS3 every second duration after the control circuit 150 deactivated the electronic apparatus 100, wherein the second duration is shorter than the first duration.

Specifically, after the control circuit 150 activated the electronic apparatus 100 for the user to use, it is less possible for the user to stop using the electronic apparatus 100 in a short time. Therefore, the passive infrared sensor 140 does not need to sense in real-time, but to sense every first duration (e.g., 3 seconds) to reduce the power consumption of the electronic apparatus 100. In one embodiment, the means may be implemented by providing the power VV intermittently, but the present disclosure is not limited thereto.

On the other hand, after the control circuit 150 deactivated the electronic apparatus 100 for being away from the user, the user may use the electronic apparatus 100 again anytime. Therefore, the passive infrared sensor 140 may sense every second duration which is shorter (e.g., 1 second). Accordingly, other than the power consumption of the electronic apparatus 100 may be reduced, the electronic apparatus 100 may be immediately activated when the user approaches the electronic apparatus 100 again, and hence the usage may be more convenient. In one embodiment, the means may also be implemented by providing the power VV intermittently, but the present disclosure is not limited thereto.

See FIG. 3, which is a scenario of using the electronic apparatus 100 according to an embodiment of the present disclosure. In the present embodiment, the electronic apparatus 100 may be a headphone 305 or an earphone, but the present disclosure is not limited thereto. The external signal source 310 may be the ear of the user shown in FIG. 3. Based on the teachings of the previous embodiments, when the user shown in FIG. 3 puts on the headphone 305, the electronic apparatus 100 may be correspondingly activated for the user to use due to the distance between the ear of the user and the electronic apparatus 100 has been less than the predetermined distance (e.g., 2 centimeters). On the other hand, when the user takes off the headphone 305, the electronic apparatus 100 may be correspondingly deactivated due to the distance between the ear of the user and the electronic apparatus 100 has been larger than the predetermined distance.

In other embodiments, the predetermined distance may be slightly increased to dozens of centimeters (which is still much lower than the detection distance of the conventional passive infrared sensor) by adjusting the capability of the attenuation element 130 attenuating the first infrared signal IS1 to improve the intelligence of the electronic apparatus 100.

To sum up, the electronic apparatus of the present disclosure may attenuate the energy of the infrared signals entering the electronic apparatus, and then the passive infrared sensor senses whether the distance between the user and the electronic apparatus is less than the predetermined distance. If yes, the control circuit of the electronic apparatus may correspondingly activate the electronic apparatus, otherwise the control circuit of the electronic apparatus may correspondingly deactivate the electronic apparatus. Accordingly, the electronic apparatus of the present disclosure may be automatically activated or deactivated according to the usage of the user (e.g., whether the user puts on the electronic apparatus), and hence the usage of the electronic apparatus may be more convenient and intuitive.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic apparatus, comprising:
a housing having an inner chamber;
a speaker disposed in the housing and segmenting the inner chamber into a front chamber and a back chamber;
an attenuation element passed through by a first infrared signal, wherein the first infrared signal comes from an external signal source, and the attenuation element attenuates an energy of the first infrared signal to generate a second infrared signal;
a passive infrared sensor disposed in the inner chamber of the housing and comprising:
a filtering element receiving the second infrared signal and filtering the second infrared signal as a third infrared signal, wherein a wavelength of the third infrared signal ranges between 9 to 10 micrometers; and
a receiving sensor receiving the third infrared signal, wherein when a distance between the attenuation element and the external signal source is not larger than a predetermined distance, the receiving sensor outputs a first electrical signal in response to the third infrared signal, and when the distance between the attenuation element and the external signal source is larger than the predetermined distance, the receiving sensor outputs a second electrical signal in response to the third infrared signal; and
a control circuit activating the electronic apparatus according to the first electrical signal or deactivating the electronic apparatus according to the second electrical signal;
wherein the control circuit comprises:
an amplifier coupled to the passive infrared sensor, and amplifying the first electrical signal as a third electrical signal or amplifying the second electrical signal as a fourth electrical signal; and
a comparator coupled to the amplifier, and comparing the third electrical signal with a predetermined threshold or comparing the fourth electrical signal with the predetermined threshold, wherein the control circuit activates the electronic apparatus when a voltage of the third electrical signal is higher than the predetermined threshold, and the control circuit deactivates the electronic apparatus when a voltage of the fourth electrical signal is higher than the predetermined threshold.

2. The electronic apparatus of claim 1, wherein the passive infrared sensor outputs the second electrical signal in response to the third infrared signal every first duration after the control circuit activates the electronic apparatus.

3. The electronic apparatus of claim 2, wherein the passive infrared sensor outputs the first electrical signal in response to the third infrared signal every second duration after the control circuit deactivates the electronic apparatus, wherein the second duration is shorter than the first duration.

4. The electronic apparatus of claim 1, wherein the attenuation element comprises a plurality of lens elements that are stacked with each other.

5. The electronic apparatus of claim 4, wherein a thickness of each of the lens elements is larger than 1.2 millimeters.

6. The electronic apparatus of claim 1, wherein the attenuation element comprises a dark lens element whose transmittance is lower than 3.5%.

7. The electronic apparatus of claim 1, wherein an energy of the second infrared signal is lower than 0.1% of an intensity of the first infrared signal.

* * * * *